United States Patent

Planeta

[11] Patent Number: 5,350,471
[45] Date of Patent: Sep. 27, 1994

[54] PRODUCTION OF CROSS-LAMINATED FILM FROM TUBE

[76] Inventor: Mirek Planeta, 170 Traders Blvd, Mississauga, Ontario, Canada, L4Z 1W7

[21] Appl. No.: 55,580

[22] Filed: May 3, 1993

[51] Int. Cl.⁵ .............................................. B29C 53/58
[52] U.S. Cl. .................... 156/156; 156/229; 156/244.14; 156/259; 156/271; 264/503; 264/514; 264/567; 264/146; 264/173; 264/DIG. 81; 425/133.1; 425/326.1
[58] Field of Search ............... 264/514, 569, 567, 173, 264/503, 146, DIG. 81; 425/326.1, 133.1; 156/244.14, 229, 156, 259, 271

[56] References Cited

U.S. PATENT DOCUMENTS

| | | | |
|---|---|---|---|
| 3,853,661 | 12/1974 | Sudo | 156/244.14 |
| 3,860,380 | 1/1975 | Upmeier | 425/326.1 |
| 3,989,785 | 11/1976 | Bridge | 264/209.2 |
| 4,011,128 | 3/1977 | Suzuki | 156/500 |
| 4,177,103 | 12/1979 | Kubät et al. | 156/244.14 |
| 4,358,330 | 11/1982 | Arnonovici | 264/514 |
| 4,439,260 | 3/1984 | Canterino et al. | 156/244.14 |
| 4,474,634 | 10/1984 | Hiraoka et al. | 156/244.14 |
| 4,496,413 | 1/1985 | Sharps, Jr. | 156/244.14 |
| 4,676,728 | 6/1987 | Planeta | 264/209.2 |

FOREIGN PATENT DOCUMENTS

| | | | |
|---|---|---|---|
| 47-39927 | 10/1972 | Japan | 264/567 |
| 54-12507 | 5/1979 | Japan | 264/209.2 |
| 1400210 | 7/1975 | United Kingdom | 156/244.14 |

*Primary Examiner*—Jeffery Thurlow
*Attorney, Agent, or Firm*—Rogers & Scott

[57] ABSTRACT

A cross-oriented multi-layer laminated plastic film is produced by first providing a flattened tubular plastic film having a outer plastic film layer with a first melting temperature and an inner plastic film layer with a second melting temperature lower than the first melting temperature, the outer plastic film layer having a molecular orientation substantially in the direction of the length of the tubular plastic film. The flattened tubular plastic film is passed from an expanding station in an expanded condition along a predetermined path in the direction of the length of said film to a collapsing station in a continuous manner. The expanded tubular plastic film is rotated about the predetermined path as the film passes from the expanding station to the collapsing station to effect cross-orientation of the outer film layer in directions inclined to the direction of travel of the tubular plastic film. The tubular plastic film is flattened at the collapsing station and pressure is applied to the flattened film at a temperature high enough to soften the inner plastic film but low enough not to soften the outer plastic film layer to an extent to cause the outer plastic film layer to lose its molecular orientation. The said pressure causes the opposite sides of the tubular plastic film to engage one another and to cause adjacent inner film layers to become bonded together and to the outer film layers to form a cross-oriented multi-layer laminated plastic film.

14 Claims, 3 Drawing Sheets

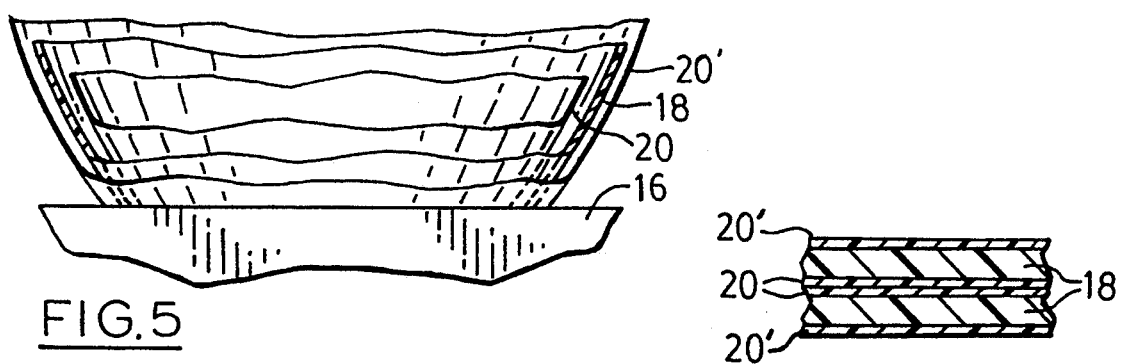
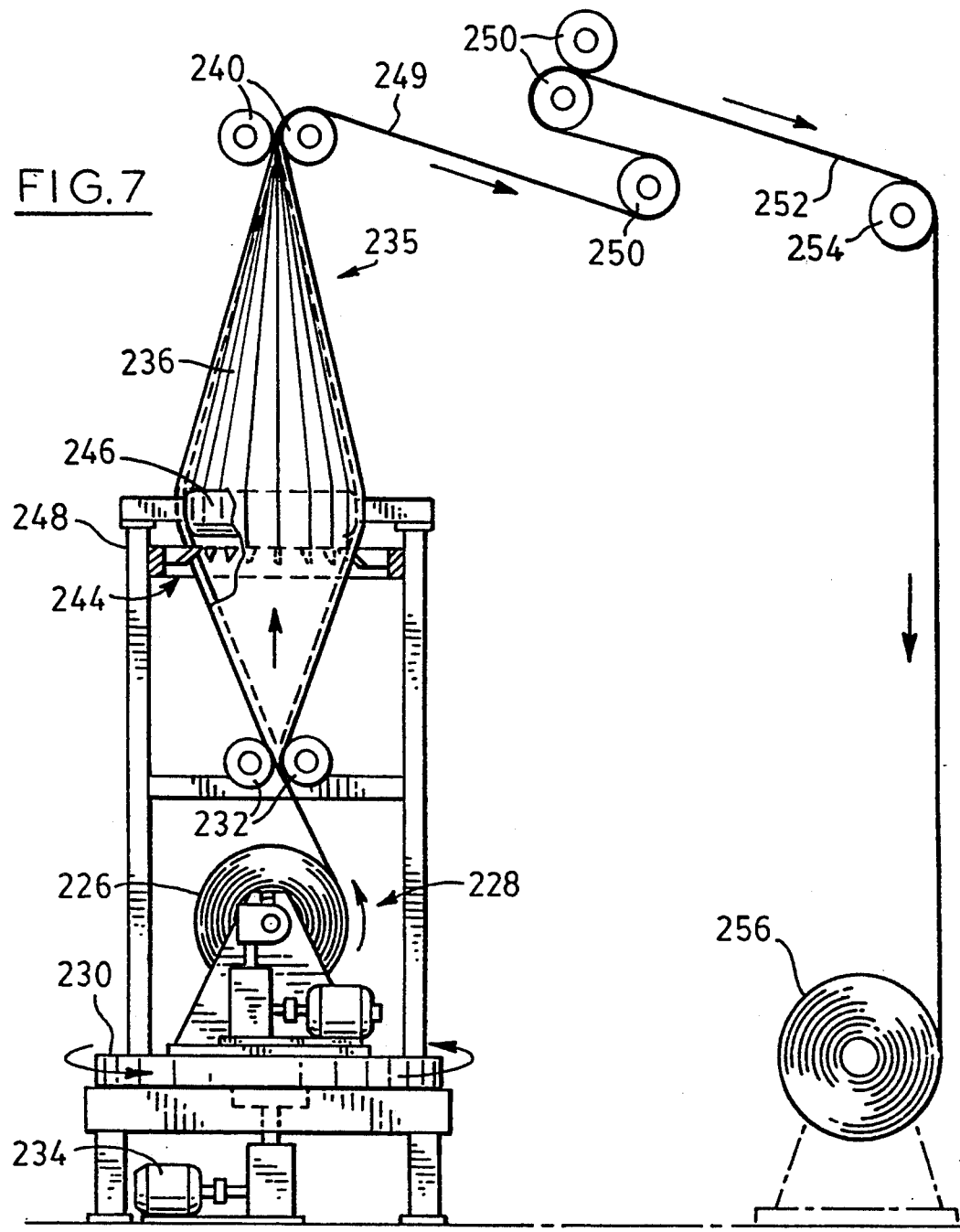

PRODUCTION OF CROSS-LAMINATED FILM FROM TUBE

FIELD OF INVENTION

This invention relates to the production of cross-oriented multi-layer laminated plastic films.

BACKGROUND OF INVENTION

It is known to produce a cross-oriented multi-layer plastic film by a blown film extrusion process in which a tubular plastic film with outer and inner plastic film layers is co-extruded from concentric annular die orifices to form a bubble which, during its travel to a collapsing station, is twisted by rotation about the direction of travel of the bubble between the extruding station and the collapsing station. The plastic film layers are extruded with molecular orientation in the direction of travel of the bubble, and the twisting of the bubble causes the molecular orientation to become inclined to the direction of travel of the bubble so that collapsing of the bubble produces a cross-oriented four-layer plastic film. Such a process is disclosed for example in U.S. Pat. No. 4,358,330 (Aronovici) issued Nov. 9, 1982, see column 6 lines 4 to 32.

According to the teaching in the Aronovici patent, the die is rotated at a certain speed which, in combination with the take off speed of the rotating cylinders at the collapsing station and the blow ratio, acts to relocate the frost line of the tubular film so that the desired molecular orientation is imparted to the film layers prior to the solidification of the extruded viscous molten plastic material. According to Aronovici, the die should be rotated at a speed in the range of between about 1 and 20 rpm, i.e. a speed substantially higher than the previously known conventional speed range of between 0.1 and 0.5 rpm. However, such higher die rotation speed and relocation of the frost line is liable to produce bubble instability which adversely affects cross-orientation. So far as applicant is aware, the Aronovici teaching has not been commercially successful.

It is therefore an object of the invention to provide an improved process for producing cross-oriented multi-layer plastic film.

SUMMARY OF THE INVENTION

According to the present invention, a method of producing a cross-oriented multi-layer laminated plastic film comprises providing a flattened tubular plastic film having a outer plastic film layer with a first melting temperature and an inner plastic film layer with a second melting temperature lower than the first melting temperature, said outer plastic film layer having a molecular orientation substantially in the direction of the length of the tubular plastic film, passing said flattened tubular plastic film from an expanding station in an expanded condition along a predetermined path in the direction of the length of said film to a collapsing station in a continuous manner, rotating the expanded tubular plastic film about the predetermined path as the film passes from the expanding station to the collapsing station to effect cross-orientation of the outer film layer in directions inclined to the direction of travel of the tubular plastic film, and flattening the tubular plastic film at the collapsing station and applying pressure to the flattened film at a temperature high enough to soften the inner plastic film layer but low enough not to soften the outer plastic film layer to an extent to cause the outer plastic film layer to lose its molecular orientation, said pressure causing the opposite sides of the tubular plastic film to engage one another and to cause adjacent inner film layers to become bonded together and to the outer film layers to form a cross-oriented multi-layer laminated plastic film.

The expanding station may be stationary and the collapsing station rotated to effect the cross-orientation. The flattened tubular plastic film may be provided by continuously co-extruding said outer film layer and inner film layer from an annular co-extrusion die to produce a tubular plastic film in an expanded condition, collapsing the tubular plastic film to a flattened condition, and passing the tubular plastic film to the expanding station.

Alternatively, the expanding station may be rotated to effect the cross-orientation with the collapsing station being stationary. The flattened tubular plastic film may be provided as a roll of film at the expanding station.

The outer plastic film layer may be of a readily molecularly oriented material selected from the group consisting of high density polyethylene, polypropylene, linear low density polyethylene, nylon, polyester, polystyrene, polyvinylchloride and polyvinylidenechloride. The outer plastic film layer may have a thickness in the range of from about 0.1 to about 4 mils.

The inner plastic film layer may be of a bonding material selected from the group consisting of ethyl vinyl acetate, low density polyethylene, linear low density polyethylene and ethyl propyl terpolymer. The inner plastic film layer may have a thickness in the range of from about 0.05 to about 1 mils, and possibly to about 2 mils.

The rotation may effect cross-orientation with an angle between the orientation axes of the outer film layers in the direction of the length of the tubular plastic film in the range of from about 10° to about 90°, for example about 45°.

The present invention also provides a cross-oriented multi-layer laminated plastic film comprising outer plastic film layers having a first melting temperature and an intermediate plastic film layer having a second melting temperature lower than the first melting temperature and bonded to said outer layers, said outer plastic film layers being molecularly cross-oriented relative to each other.

The present invention also provides apparatus for producing a cross-oriented multi-layer laminated plastic film comprising an extruding station for co-extruding a tubular plastic film in an expanded condition having an outer plastic film layer with a first melting temperature and an inner plastic film layer with a second melting temperature lower than the first melting temperature, said outer plastic film layer having a molecular orientation substantially in the direction of the length of the tubular plastic film, a collapsing station for collapsing the tubular plastic film from the extruding station to a flattened condition, an expanding station for returning the flattened tubular plastic film from the collapsing station to an expanded condition, and a second collapsing station for rotating the tubular plastic film from the expanding station about the path of the tubular plastic film as it travels from the expanding station to the second collapsing station to effect cross-orientation of the outer film layer in directions inclined to the direction of travel of the film, collapsing the oriented film to a flattened condition and applying pressure to the flattened film at a temperature high enough to soften the inner plastic film layer but low enough not to soften the outer plastic film layer to an extent to cause the outer plastic film layer to lose its molecular orientation, whereby adjacent inner film layers become bonded together and to the outer film layers to form a cross-oriented multi-layer laminated plastic film.

The invention further provides apparatus for producing a cross-oriented multi-layer laminated plastic film from a flattened tubular plastic film having an outer plastic film layer with a first melting temperature and an inner plastic film layer with a second melting temperature lower than the first melting temperature, said outer plastic film layer having a molecular orientation substantially in the direction of the length of the tubular plastic film, said apparatus comprising:

an expanding station for providing the tubular plastic film in an expanded condition, a collapsing station for receiving the tubular plastic film from the expanding station from which the tubular plastic film has travelled along said longitudinal axis, and a drive assembly for rotating one of said stations so as to rotate the tubular plastic film about the path of the film as it travels from the expanding station to the collapsing station, said rotation of said one of said stations cross-orienting the outer film layer in directions inclined to the direction of travel of the tubular plastic film, and said collapsing station operating to flatten the tubular plastic film and apply pressure to the flattened film at a temperature high enough to soften the inner plastic film layer but low enough not to soften the outer plastic film layer to an extent to cause the outer plastic film layer to lose its molecular orientation, whereby adjacent inner film layers become bonded together and to the outer film layers to form a cross-oriented multi-layer laminated plastic film.

The drive means may rotate the expanding station, and the expanding station may comprise a support for a roll of the tubular plastic film in a flattened condition with said expanding station operating to feed the tubular plastic film from the roll thereof and transform the tubular plastic film to an expanded condition for travel to the collapsing station.

The initial tubular plastic film may have a further bonding plastic film layer external to the outer plastic film layer and having a melting temperature lower than the melting temperature of the outer plastic film layer, the external plastic film layers being bonded to the outer plastic film layers in the resultant cross-oriented multi-layer laminated plastic film.

The tubular plastic film may be slit into longitudinally extending ribbons as it is passed in an expanded condition to the collapsing station. This enables a porous laminated plastic film to be produced, especially if the slit bubble is widened.

Also, if desired, the tubular plastic film may be heated at one or more convenient locations to further molecularly orient the outer plastic film layers in the direction of travel.

BRIEF DESCRIPTION OF THE DRAWINGS

Embodiments of the invention will now be described, by way of example, with reference to the accompanying drawings, of which:

FIG. 5 is similar to FIG. 2 but shows a plastic film bubble in accordance with another embodiment of the invention, FIG. 6 is similar to FIG. 3 but shows the embodiment FIG. 5, and FIG. 7 is similar to FIG. 4 but shows apparatus for producing cross-oriented multi-layer laminated plastic film in accordance with a further embodiment of the invention.

DESCRIPTION OF PREFERRED EMBODIMENTS

Figure 1:
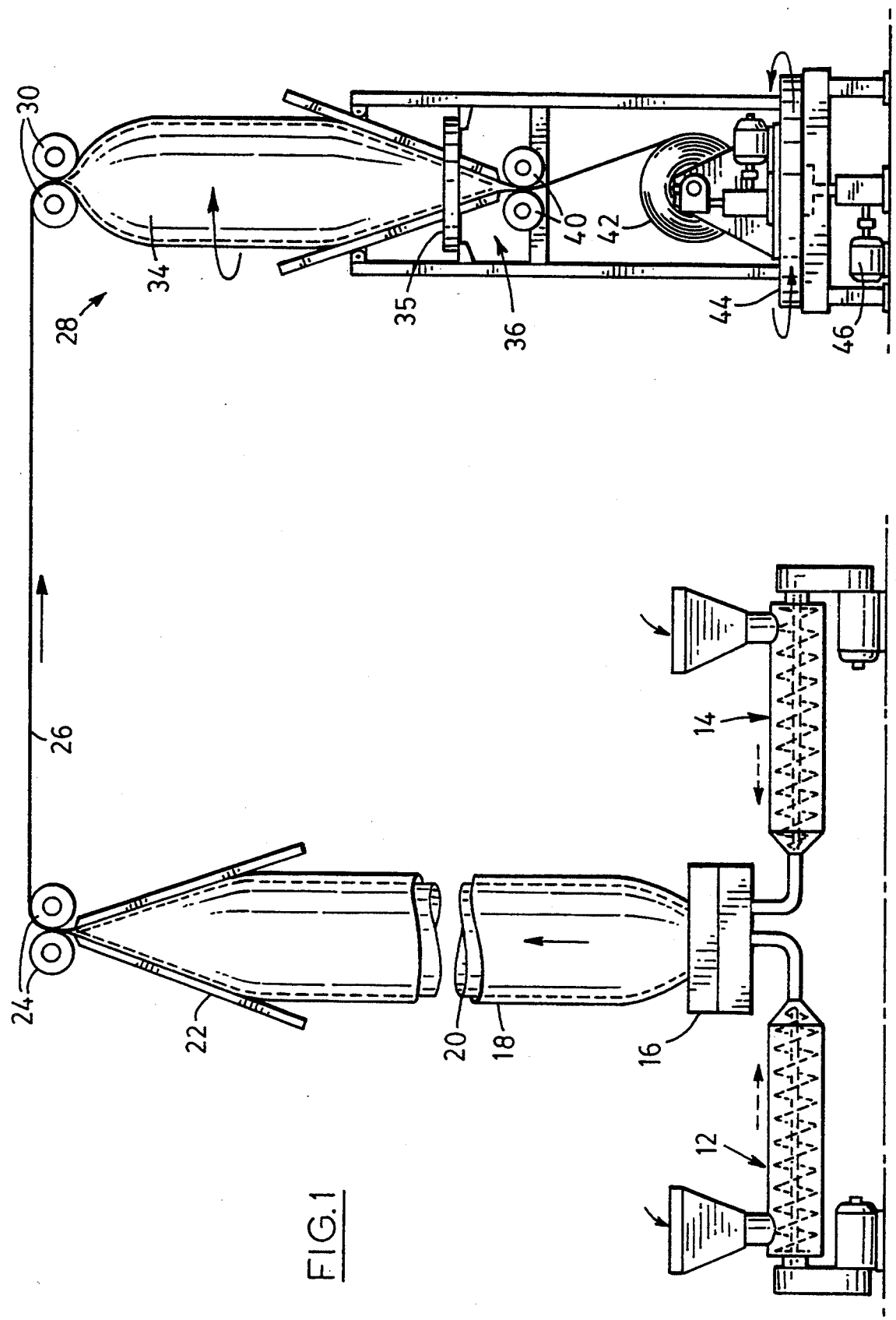
FIG. 1 is a diagrammatic view of an in-line process for producing cross-oriented multi-layer laminated plastic film in accordance with one embodiment of the invention.
Figure 2:
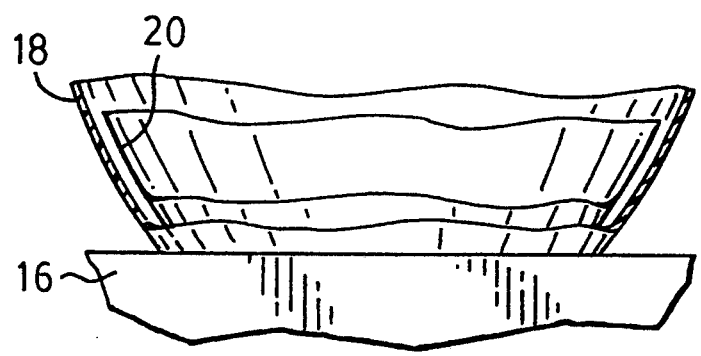
FIG. 2 is a sectional view of the co-extruded plastic film bubble as it leaves the extruding station.
Figure 3:
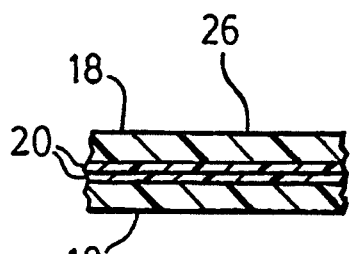
FIG. 3 is a sectional view of the cross-oriented multi-layer laminated plastic film after passing through the second collapsing station.

Referring first to FIGS. 1 to 3 of the accompanying drawings, apparatus for producing a cross-oriented multi-layer laminated plastic film in accordance with one embodiment of the invention comprises two extruders 12, 14 and co-extrusion die 16 of known kind. The extruders 12, extrude different plastic materials and the co-extrusion die 16 has two concentric annular die orifices so that the plastic materials are extruded as a bubble with an outer tubular plastic film layer 18 and an inner tubular plastic film layer 20.

The outer plastic film layer 18 has a molecular orientation in the direction of the length of the tubular plastic film, i.e. in what is known in the art as the machine direction.

The plastic material forming the outer plastic film layer 18 has a melting temperature which is higher than the melting temperature of the plastic material which forms the inner plastic film layer 20. The two layer tubular plastic film bubble proceeds to a collapsing frame 22 which collapses the bubble to a flattened form, and the flattened tubular film is passed through the nip of feed rollers 24.

As so far described, the apparatus is substantially conventional and the operating conditions can be adjusted, as will be readily apparent to a person skilled in the art, to accomodate requirements specific to the different plastic materials being used so as to produce the two layer tubular plastic film with required properties.

In accordance with this embodiment of the invention, the flattened tubular plastic film 26 passes from the feed rollers 24 of the first collapsing station to an expanding station 28 which comprises a pair of feed rollers 30. After leaving feed rollers 30, the flattened film 26 expands to re-form a bubble configuration 34. The film then passes through an annular heater 35 and to a second collapsing station 36 which comprises a pair of heated collapsing rollers 40 and a wind-up roll 42 mounted on a platform 44. The second orienting station 36 is rotatable by a motor 46.

In operation, as previously mentioned, the outer and inner plastic film layers 18, 20 are extruded from the annular die 16 to form a tubular bubble with molecular orientation of the outer plastic film layer 18 in the direction of travel of the bubble to the collapsing frame 22, with the various operating conditions being adjusted in a manner to produce optimum results.

The outer plastic film layer 18 may for example be of high density polyethylene with a thickness in the range of from about 0.1 to about 4 mils and a melting temperature of about 130° C. The inner plastic film 20 may for example be of ethyl vinyl acetate with a thickness in the range of from about 0.05 to about 1 mils and a melting temperature of about 90° to 100° C.

The film bubble is collapsed by collapsing frame 22 and fed between feed rollers 24 to complete the collapsing of the bubble to a flattened form, but without any fusion between the inner plastic film layers 20. The flattened film 26 is passed to the expanding station 28 where, after passing through feed rollers 30, the flattened film 26 expands to form film bubble 34. Air is trapped in the film bubble 34 when the film is initially fed through the apparatus.

The film bubble 34 passes to second collapsing station 36 which is rotated about the direction of travel of the film bubble 34 at a relatively high speed, for example in the range of from about 10 to about 100 rpm. As a result, the outer plastic film layers 18 are cross-oriented to an angle inclined to the direction of travel in the range of from about 5° to about 45°, preferably, about 22.5°, this angle depending on the ratio of the speed of travel of the film bubble 34 to the rotational speed.

The cross-oriented film is heated by the annular heater 35 and heated and flattened by feed rollers 40 at such a temperature that the inner plastic film layers 20 soften sufficiently to become bonded to each other and to the respective outer layers 18 as indicated in FIG. 3. The bonding temperature is not high enough to cause softening of the outer plastic film layers 18 to an extent to cause loss of molecular orientation therein. The resultant cross-oriented multi-layer laminated plastic film is then wound on roll 42, the resultant angle between the orientation axes of the outer film layers 18 in the direction of the length of the film being in the range of from about 10° to about 90°, preferably about 45°. In the finished product, the bonded inner plastic film layers 20 will have a resultant bonded thickness in the range of from about 0.01 to about 2 mils.

Figure 4:
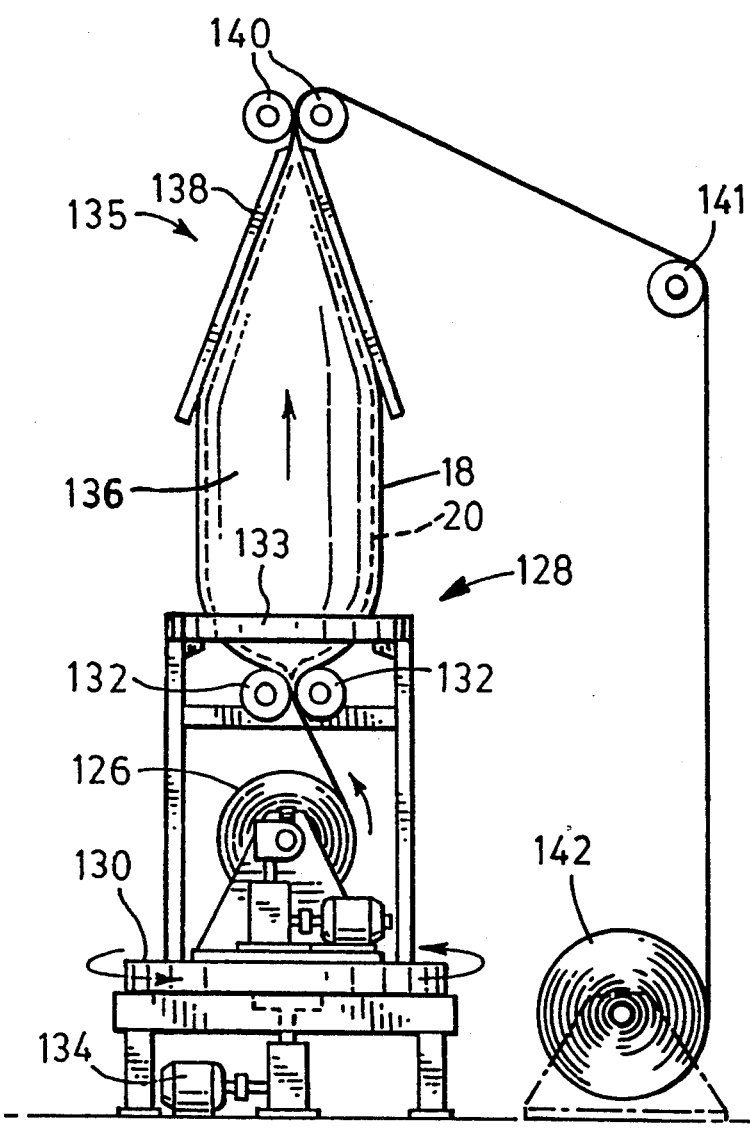
FIG. 4 is a diagrammatic view of an out-of-line process for producing cross-oriented multi-layer laminated plastic film in accordance with another embodiment of the invention.

FIG. 4 shows an alternative embodiment in which molecularly oriented flattened tubular plastic film similar to the plastic film 26 of the previous embodiment is supplied as a roll 126 to a rotatable expanding station 128 comprising a platform 130 supporting the roll 126 and feed rollers 132 rotatable by a motor 134.

Feed rollers 132 feed the tubular plastic film 126 to form a bubble 136 which passes to a collapsing station 135 comprising a collapsing frame 138 which collapses the bubble 136 to a flattened form, and heated rollers 140 which feed the flattened film via roller 141 onto a roll 142. An annular heater 133 surrounds the tubular film shortly after the film leaves the feed rollers 132 so as to heat the outer plastic film layer 18 sufficiently to cause further molecular orientation to occur in the outer plastic film layer 18 in its direction of travel as it passes from the feed rollers 132 to the collapsing frame 138. The bubble formation is achieved by trapping air in the bubble when the film is initially fed through the apparatus.

During operation, the expanding station 128 is rotated by motor 134 about the direction of travel of the film bubble 136 and the heated rollers 140 at the collapsing station 135 cause the inner plastic film layers 20 to become bonded to each other and to the respective outer film layers 18 to form a cross-oriented multi-layer laminated plastic film in the same manner as in the previous embodiment. As before, the bonding temperature is not high enough to cause softening of the outer plastic film layers 18 to an extent to cause loss of molecular orientation therein.

The two layer tubular plastic film can be formed under optimum conditions and the subsequent cross-orientation can also be effected under optimum conditions. By suitable choice of plastic material for the outer and inner film layers and also by suitable choice of operating conditions, the invention is especially useful for producing cross-oriented multi-layer laminated plastic films which are strong and have high impact resistance and hence are especially suitable for such uses such as shrink wrapping various goods and as packaging for heavy goods such as lumber. The outer plastic film layers can be relatively rigid and/or impact resistant and the inner plastic film layers may also be capable of energy absorption in addition to their bonding function. Such advantages are enhanced when relative softness of the inner plastic film layers permits relative movement between the outer plastic film layers.

If desired, as shown in FIG. 5, an external tubular plastic film layer 20' may be extruded simultaneously with the outer plastic film 18 and the inner plastic film layer 20, the external plastic film layer 20' (like the inner plastic film layer 20) being formed of plastic material with a melting temperature lower than the melting temperature of the plastic material which forms the outer plastic film layer 18. In this case, the apparatus shown in FIG. 1 would be provided with a suitable extrusion die of known kind and a further extruder (not shown) if the external tubular plastic film layer 20' is of a different plastic material from that of the inner tubular plastic film layer 20. Usually however, the external tubular plastic film layer 20' and the inner tubular plastic film layer 20 will be of the same plastic material.

The resultant cross-oriented multi-layer laminated plastic film will be as shown in FIG. 6. The external plastic film layers 20' like the inner plastic film layers 20, are bonding layers and can be utilized to bond cross-oriented multi-layer laminated plastic film as shown in FIG. 6 to other film which may or may not be the same so as to form thicker composite films of increased strength.

Also, if desired, the apparatus shown in FIG. 1 may be provided with appropriately positioned heaters (not shown) to effect further molecular orientation of the outer plastic film layer 18 in its direction of travel during travel from the rollers 24 to the rollers 30 and/or during travel from the rollers 30 to the rollers 40 in a manner similar to the further molecular orientation effect by the heater 133 provided in the apparatus shown in FIG. 4.

FIG. 7 shows an embodiment resembling that shown in FIG. 4 but in which the tubular film is slit into a multitude of side by side ribbons before bonding. The apparatus of FIG. 7 has molecularly oriented flattened tubular plastic film, similar to the plastic film 126, supplied as a roll 226 to a rotatable expanding station 228 comprising a platform 230 supporting the roll 226 and feed rollers 232 rotatable by a motor 234. Feed rollers 232 feed the tubular plastic film 226 to form a bubble 236 which passes to collapsing station 235 comprising rollers 240 which collapse the bubble 236 to a flattened form.

After leaving the rollers 232, the bubble 236 is slit by an annular slitter 244 into a multitude of side by side ribbons. Since the slit bubble cannot retain air to maintain the bubble configuration, this is effected by an internal mandrel 246 supported by a support frame 248. If desired, the mandrel 246 may be dimensioned to expand the slit bubble to space the ribbons from one another. It will be appreciated that in this embodiment mandrel 246 is part of the expanding station 228.

After leaving the rollers 240, the slit flattened tubular film 249 passes around a series of heated rollers 250 which causes the slit inner plastic film layers 20 to become bonded to each other and to the respective slit outer film layers 18 to form a cross-oriented slit porous multi-layer laminated plastic film 252 which, after passing around guide roller 254, is wound onto a roll 256. If the internal mandrel 246 is widened to space the ribbons from one another, the resultant laminated plastic film 252 will nave a net-like structure.

A slitter may if desired be provided in the apparatus shown in FIG. 1, for example to slit the tubular film as it leaves the rollers 30.

Other embodiments of the invention will also be readily apparent to a person skilled in the art, the scope of the invention being defined in the appended claims.

I claim:

1. A method of producing a cross-oriented multi-layer laminated plastic film comprising;
   providing a flattened tubular plastic film having a outer plastic film layer with a first melting temperature and an inner plastic film layer with a second melting temperature lower than the first melting temperature, said outer plastic film layer having a molecular orientation substantially in the direction of the length of the tubular plastic film,
   passing said flattened tubular plastic film from an expanding station in an expanded condition along a predetermined path in the direction of the length of said film to a collapsing station in a continuous manner,
   rotating the expanded tubular plastic film about the predetermined path as the film passes from the expanding station to the collapsing station to effect cross-orientation of the outer film layer in directions inclined to the direction of travel of the tubular plastic film, and
   flattening the tubular plastic film at the collapsing station and applying pressure to the flattened film at a temperature high enough to soften the inner plastic film layer but low enough not to soften the outer plastic film layer to an extent to cause the outer plastic film layer to loose its molecular orientation, said pressure causing the opposite sides of the tubular plastic film to engage one another and to cause adjacent inner film layers to become bonded together and to the outer film layers to form a cross-oriented multi-layer laminated plastic film.

2. A method according to claim 1 wherein said expanding station is stationary and said collapsing station is rotated to effect said cross-orientation.

3. A method according to claim 2 wherein said flattened tubular plastic film is provided by continuously co-extruding said outer film layer and inner film layer from an annular co-extrusion die to produce a tubular plastic film in an expanded condition, collapsing the tubular plastic film to a flattened condition, and passing the flattened tubular plastic film to the expanding station.

4. A method according to claim 1 wherein said expanding station is rotated to effect said cross-orientation and said collapsing station is stationary.

5. A method according to claim 4 wherein said flattened tubular plastic film is provided as a roll of said film at the expanding station.

6. A method according to claim 1 wherein the outer plastic film layer is of a readily molecularly oriented material selected from the group consisting of high density polyethylene, polypropylene, linear low density polyethylene, nylon, polyester, polystyrene, polyvinyl chloride and polyvinylidenechloride.

7. A method according to claim 1 wherein the outer plastic film layer has a thickness in the range of from about 0.1 to about 4 mils.

8. A method according to claim 7 wherein the outer plastic film layer is of high density polyethylene.

9. A method according to claim 1 wherein the inner plastic film layer is of a bonding material selected from the group consisting of ethyl vinyl acetate low density polyethylene, linear low density polyethylene and ethyl propyl terpolymer.

10. A method according to claim 1 wherein the inner plastic film layer has a thickness in the range of from about 0.05 to about 1.0 mils.

11. A method according to claim 10 wherein the inner plastic film layer is of ethyl vinyl acetate.

12. A method according to claim 1 wherein said rotation effects cross-orientation with an angle between the orientation axes of the outer film layers in the direction of the length of the tubular plastic film in the range of from about 10° to about 90°.

13. A method according to claim 1 wherein said flattened tubular plastic film provided has a further bonding plastic film layer external to the outer plastic film layer and having a melting temperature lower than the melting temperature of the outer plastic film layer, said external plastic film layers being bonded to the outer plastic film layers in the resultant cross-oriented multi-layer laminated plastic film.

14. A method according to claim 1 including slitting the tubular plastic film into longitudinally extending ribbons as it is passed in an expanded condition to the collapsing station.

* * * * *